United States Patent
Ito et al.

(10) Patent No.: US 10,082,446 B2
(45) Date of Patent: Sep. 25, 2018

(54) TIRE TESTING APPARATUS

(71) Applicant: A&D COMPANY, LIMITED, Tokyo (JP)

(72) Inventors: Yukihisa Ito, Saitama (JP); Kazuki Kido, Saitama (JP); Tatsuo Ichige, Saitama (JP); Masaaki Banno, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/509,250

(22) PCT Filed: Aug. 25, 2016

(86) PCT No.: PCT/JP2016/074753
§ 371 (c)(1),
(2) Date: Mar. 7, 2017

(87) PCT Pub. No.: WO2017/056798
PCT Pub. Date: Apr. 6, 2017

(65) Prior Publication Data
US 2017/0307479 A1      Oct. 26, 2017

(30) Foreign Application Priority Data
Oct. 1, 2015   (JP) .................................. 2015-195796

(51) Int. Cl.
*G01M 17/02*   (2006.01)
*B60C 25/00*   (2006.01)
*B60C 25/05*   (2006.01)

(52) U.S. Cl.
CPC ........... *G01M 17/02* (2013.01); *B60C 25/007* (2013.01); *B60C 25/0551* (2013.01)

(58) Field of Classification Search
CPC ............................. G01M 17/02; B60C 25/007
(Continued)

(56) References Cited

U.S. PATENT DOCUMENTS

| | | | |
|---|---|---|---|
| 8,312,766 B2* | 11/2012 | Pingel | G01L 17/005 73/146.5 |
| 2010/0139383 A1* | 6/2010 | Haswell | B60C 11/24 73/146 |
| 2015/0135812 A1* | 5/2015 | Kuwayama | G01M 17/022 73/146 |

FOREIGN PATENT DOCUMENTS

| | | |
|---|---|---|
| CN | 201289413 Y | 8/2009 |
| CN | 204535837 U | 8/2015 |

(Continued)

OTHER PUBLICATIONS

Series 260/261 3-Component Dynamic Force Sensors, 2009, PCB piezotronics, pp. 1-4.*

(Continued)

*Primary Examiner* — Manish S Shah
*Assistant Examiner* — Jean Morello
(74) *Attorney, Agent, or Firm* — Roberts Mlotkowski Safran Cole & Calderon, P.C.

(57) ABSTRACT

Provided is a tire testing apparatus capable of accurately and easily measuring a load which a tire receives from a road surface. The tire testing apparatus includes a plate buried in a road surface with which a tire is in contact, at least one ground-contact-force sensor measuring a ground-contact force during a contact of the tire, and at least one plate sensor measuring a load applied to the plate. According to the tire testing device, a ground-contact force of the tire can be measured by the ground-contact-force sensor and a load which the tire applies to the plate can be measured by the plate sensor.

6 Claims, 3 Drawing Sheets

(58) Field of Classification Search
USPC .................................................. 73/146, 146.5
See application file for complete search history.

(56) References Cited

FOREIGN PATENT DOCUMENTS

| JP | 09089690 A | * | 4/1997 | ............... G01L 1/22 |
| --- | --- | --- | --- | --- |
| JP | 2000-162054 A | | 6/2000 | |
| JP | 4150351 B2 | | 9/2008 | |
| JP | 4367613 B2 | | 11/2009 | |
| JP | 2014206464 A | * | 10/2014 | ............ G01M 17/02 |
| KR | 2020090013247 U | | 12/2009 | |
| KR | 101305258 B1 | | 9/2013 | |
| WO | 2014/171573 | | 10/2014 | |

OTHER PUBLICATIONS

International Search Report and Written Opinion dated Nov. 22, 2016 in the corresponding application PCT/JP2016/074753.

* cited by examiner

TIRE TESTING APPARATUS

CROSS-REFERENCE TO RELATED APPLICATIONS

The present application is a U.S. National Phase of PCT/JP2016/074753 filed on Aug. 25, 2016, claiming priority to Japanese Patent Application No. 2015-195796 filed Oct. 1, 2015. The disclosure of the PCT Application is hereby incorporated by reference into the present application.

TECHNICAL FIELD

The present invention relates to tire testing apparatuses. In particular, the present invention relates to a tire testing apparatus measuring a ground-contact force which a tire receives from a road surface.

BACKGROUND ART

In recent years, attempts have been made to accurately keep track of a load (ground contact force) applied to a tire of a traveling vehicle. For example, in Patent Literature 1, a sensor unit having a gauge attached to a column member is buried in a road surface, and the sensor unit is configured to measure three-dimensionally the load when the tire passes. A plurality of the sensor units is arranged in a row in a direction perpendicular to the traveling direction of the tire, so that a load applied to the tire can be measured at a plurality of positions in the width direction of the tire. According to circumstances, a plurality of rows of the sensor units is arranged, so as to measure distribution and fluctuation of the load even in the traveling direction of the tire.

CITATION LIST

Patent Literatures

Patent Literature 1: Japanese Patent Application Laid-Open No. 2000-162054
Patent Literature 2: Japanese Patent No. 4367613

SUMMARY OF INVENTION

Technical Problem

However, with the measuring apparatus as described above, it is impossible to know when the tire passes over the sensor units and on which sensor unit the tire passes. For this reason, the measuring apparatus can realize only rough measurement.

In Patent Literature 2, providing a sensor unit with a laser sensor or a touch sensor enables the sensor unit to obtain information such as position and speed of a tire. However, providing such other sensors as in Patent Document 2 requires additional operations such as synchronization of such other sensors with signals of the sensor unit and accurate calculation of a positional relation between the additional sensors and the sensor unit. Further, if these operations are not performed accurately, a measurement precision may decrease.

The present invention has been made in view of such circumstances, and it has an object to provide a tire testing apparatus capable of measuring a load which the tire receives from a road surface accurately and easily.

Solution to Problem

In order to achieve the above object, the invention claimed in the claim 1 provides a tire testing apparatus including a plate buried in a road surface with which a tire is in contact, at least one ground-contact-force sensor measuring a ground-contact force during a contact of the tire, the ground-contact-force sensor being fixed on the plate in an embedded state, and at least one plate sensor measuring a load applied to the plate.

According to the present invention, the at least one ground-contact-force sensor is not buried directly in the road surface but is buried via the plate, and it can measure a load applied to the plate. Thus, the tire rides on the plate to apply the load to the plate immediately before the tire passes over the ground-contact-force sensor. Accordingly, it is possible to keep track of timing at which the tire passes over the ground-contact-force sensor. Thereby, the volume of measurement data can be suppressed to a practical size, a sampling cycle can be set short, and measurement can be performed highly accurately.

Further, according to the present invention, the ground-contact-force sensor is fixed to the plate, so that a positional relation between the plate sensor and the ground-contact-force sensor is fixed. Accordingly, synchronization of measurement signals of both sensors can be performed relatively easily. Moreover, according to this invention, the ground-contact-force sensor is fixed to the plate. Therefore, even if the ground-contact-force sensor includes a plurality of ground-contact-force sensors, the plurality of ground-contact-force sensors can be accurately positioned to be installed.

According to the invention claimed in the claim 2, in the claim 1, the plate sensor measures the plate at a plurality of positions in the plate. According to the present invention, it is possible to keep track of the centroid of the load in the plate to know the track of the tire on the plate. Thereby, it is also possible to know an approach angle of the tire to the sensors and a moving speed of the tire. Furthermore, use of such information enables more accurate processing of data of the sensor.

According to the invention claimed in the claim 3, in the claim 1 or 2, an output signal of the ground-contact-force sensor is obtained based on an output signal of the plate sensor. With this invention, the output signal of the ground-contact-force sensor is obtained in response to the load of the plate, so that more accurate sampling can be performed.

Advantageous Effects of Invention

According to the present invention, the ground-contact-force sensor is fixed to the plate and the plate sensor measures the load of the plate, so that it is possible to keep track of timing at which the tire passes over the ground-contact-force sensor and to perform accurate positioning of the ground-contact-force sensor.

DESCRIPTION OF EMBODIMENTS

Figure 1:
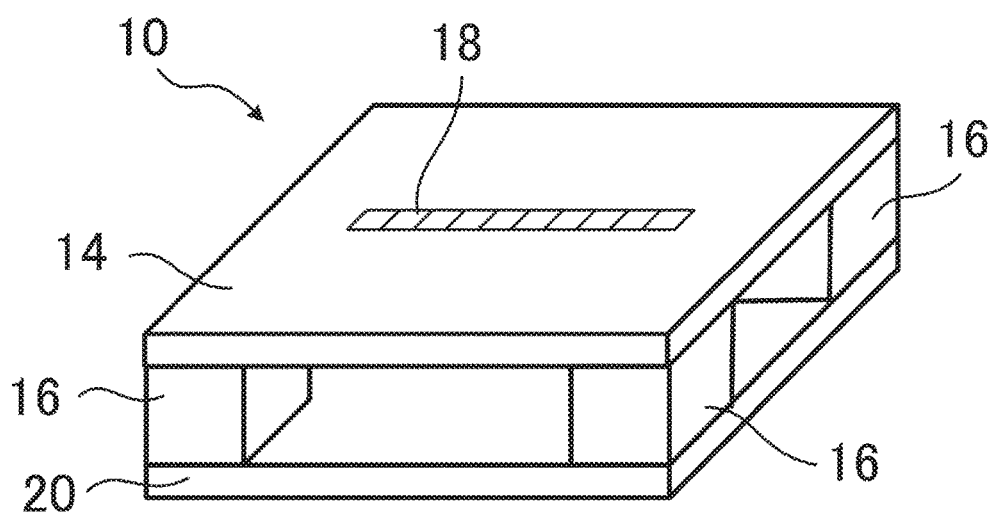
FIG. 1 is a perspective view of a tire testing apparatus according to the present invention illustrating a schematic configuration of a measuring section of the apparatus.
Figure 2:
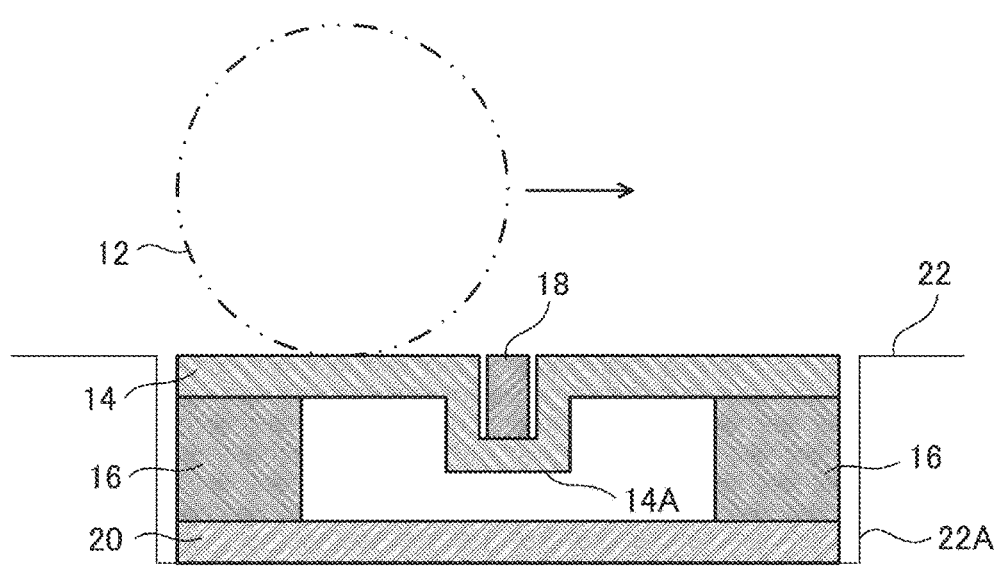
FIG. 2 is a sectional side view of the tire testing apparatus illustrating a state where the measuring section in FIG. 1 is buried in a road surface.

With reference to the accompanying drawings, preferred embodiments of a tire testing apparatus according to the present invention will be described. FIG. 1 is a perspective view of a tire testing apparatus 10 to which the present invention is applied, illustrating a measuring section thereof. FIG. 2 is a sectional view of the measuring section buried in a road surface.

The measuring section of the tire testing apparatus 10 is disposed at a position that the tire 12 of a traveling vehicle passes. The tire testing apparatus 10 is mainly constituted of a plate 14, plate sensors 16, ground-contact-force sensors 18, and a base 20.

The plate 14 and the base 20 are formed in a rectangular shape having substantially same size. The plate 14 and the base 20 are vertically spaced apart from each other, and each of the plate sensors 16 is respectively disposed at each of four corners of the space between the plates 14 and the base 20. The plate sensors 16 are sensors for measuring a load of the plate 14. Tough the configuration of the plate sensors 16 is not limited, an example of the plate sensors 16 is a load cell. In the case of the load cell, a fixed portion of a flexure element of the load cell is fixed to the base 20 and a movable portion of the flexure element is fixed to the plate 14. The load of the plate 14 is detected by a gauge stuck to a deformable portion of the flexure element. The plate sensors 16 are connected to a control device 24, which is described later, and the control device 24 calculates the load and the centroid of the load in the plate 14.

As shown in FIG. 2, the plate 14 has a concave portion 14A in the middle position thereof formed in the width direction of the tire 12. The concave portion 14A has a plurality of the ground-contact-force sensors 18 arranged in a row.

Figure 3:
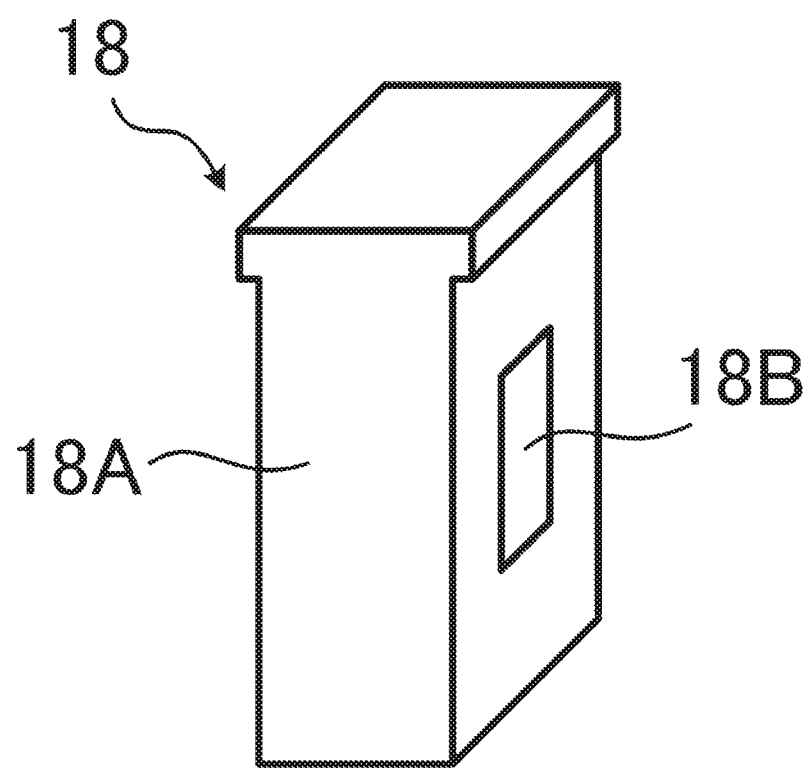
FIG. 3 is a perspective view of a ground-contact-force sensor.

Each of the ground-contact-force sensors 18, as shown in FIG. 3, includes a flexure element 18A formed in a columnar shape and a gauge 18B attached to a side surface thereof. A lower part of the flexure element 18A is fixed to the concave portion 14A of the plate 14 to integrate the ground-contact-force sensor 18 with the plate 14. An upper part of the flexure element 18A is formed to slightly protrude in the traveling direction (anteroposterior direction) of the tire 12, and the upper surface of the flexure element 18A is configured to form the same plane as the upper surface of the plate 14. Further, the flexure element 18A, except for the lower portion thereof, is arranged with a slight gap with respect to the plate 14, enabling the flexure element 18A to deform slightly. On the other hand, the gauge 18B is connected to the control device 24, which is described later, to enable the control device 24 to calculate three force components (vertical force, front-rear force, lateral force). The configuration of the ground-contact-force sensors 18, particularly, the shape of the flexure element 18A, is not limited to the example described above as long as the force received from the tire 12 can be measured. FIG. 1 illustrates an example in which ten ground-contact-force sensors 18 are arranged in a row. However, the number and arrangement of the ground-contact-force sensors 18 are not limited to thereto. For example, a greater number (by way of example, about 60) of the ground-contact-force sensors 18 may be arranged in a row, or may be arranged in a plurality of rows in the traveling direction of the tire 12.

The measuring section of the tire testing apparatus 10 configured as described above is arranged in a recess 22A in a road surface 22, as shown in FIG. 2. The recess 22A of the road surface 22 is formed slightly larger than the plate 14, such that the plate 14 does not come into contact with a wall surface of the recess 22A. Further, the depth of the recess 22A matches the height of the measuring section of the tire testing apparatus 10, so that the upper surface of the plate 14 and the road surface 22 form the same plane.

Figure 4:
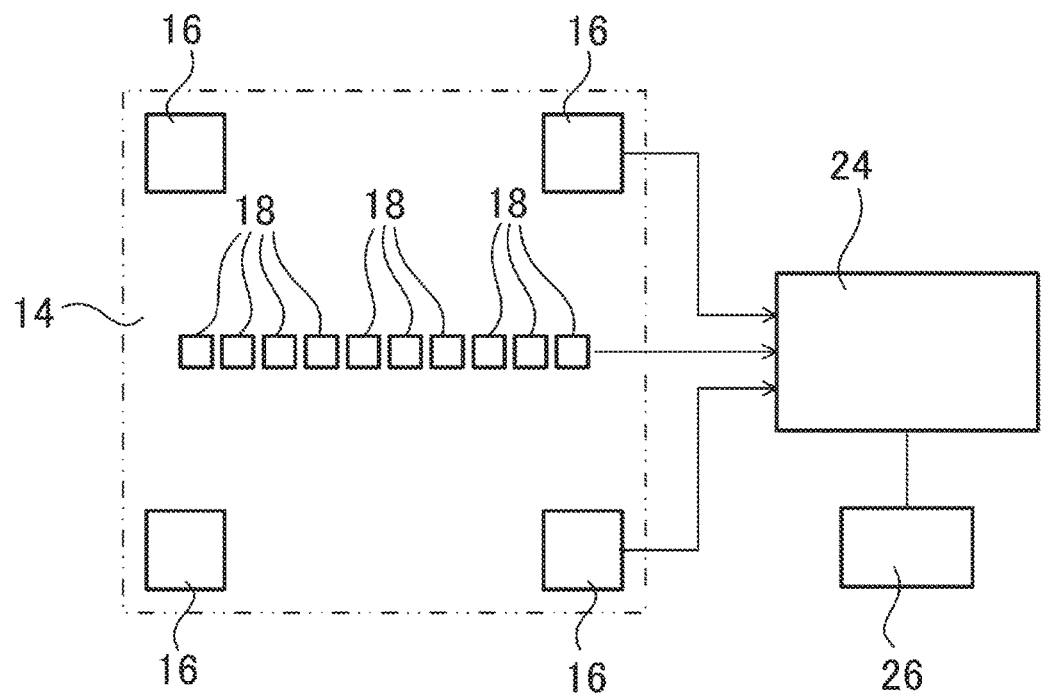
FIG. 4 is a block diagram schematically illustrating a configuration of the tire testing apparatus.

FIG. 4 is a block diagram schematically illustrating the configuration of the tire testing apparatus 10. The plate sensors 16 and the ground-contact-force sensors 18 are connected to the control device 24. The control device 24 includes an amplifier, an AD converter, an arithmetic circuit, a memory, and the like, inside thereof. The control device 24 is configured in such a way as to amplify signals of the plate sensors 16 and the ground-contact-force sensors 18 to AD convert them, to perform various arithmetic processing, and to record data obtained by the arithmetic processing. Examples of the arithmetic processing include calculation of a total value or a centroid of the load applied to the plate 14 on the basis of the signals of the plate sensors 16 and calculation of the three force components applied to each ground-contact-force sensor 18 on the basis of the signals of the ground-contact-force sensors 18.

In addition, the control device 24 is configured in such a way as to control the ground-contact-force sensor 18 to start and stop sampling on the basis of output signals of the plate sensor 16. For example, the ground-contact-force sensor 18 is set to start sampling when the load of the tire 12 applied to the plate sensor exceeds a predetermined value, and to stop sampling when the load of the tire 12 disappears from the plate sensor 16. As a result, sampling time of the ground-contact-force sensor 18 is shortened. Therefore, sampling frequency can be increased without worrying about a measurement data capacity. Thereby, the number of effective data can be increased, so that highly precise measurement can be performed.

The control device 24 is connected to a display 26. The display 26 displays various kinds of information. For example, the display 26 can display a vertical load, wherein a position coordinate of the ground-contact-force sensor 18 is set on the horizontal axis and a time (or a position coordinate converted from the time as a position in a front-rear direction) is set on the vertical axis. The display 26 also can display a figure showing a front-rear load and a lateral load by vectors.

Next, functions of the tire testing apparatus 10 configured as described above will be described.

A conventional tire testing apparatus does not include a plate sensor 16 and thus cannot measure a load of a plate 14. For this reason, it is impossible to know when the tire 12 passes a ground-contact-force sensor 18. This makes sampling intervals of the ground-contact-force sensor 18 long and makes it difficult to collect accurate data.

By contrast, in the present embodiment, the plate sensors 16 are provided to detect the load of the plate 14, and start and stop of the sampling of the ground-contact-force sensors 18 are determined on the basis of the output signals of the plate sensors 16. This configuration eliminates the need for unnecessarily lengthening the sampling intervals of the plate sensor 16, shortens the sampling interval and enables collecting data with high accuracy.

Further, in the present embodiment, since four plate sensors 16 are provided, it is possible to calculate the centroid of the load of the plate 14 to obtain a passing track of the tire 12 accurately. Thereby, data verification of the ground contact force, which was conventionally impossible, can be performed on the basis of the track of the tire 12. For example, in a conventional apparatus, even if a ground-contact-force sensor 18 does not detect a ground contact force, the cause was not clear. That is, it was not clear whether the cause was the tire 12 not passing on the ground-contact-force sensor 18, or the groove of the tire 12 just overlapping with the position of the sensor by accident. On the other hand, in the present embodiment, since the passing track of the tire 12 is known, an influence of the groove of the tire 12 can be accurately considered.

Moreover, according to the present embodiment, since four plate sensors 16 are provided, a track of the tire 12 with respect to the ground-contact-force sensor 18 and a moving speed of the tire 12 can be grasped. Accordingly, for example, even if the tire 12 enters the tire testing apparatus 10 while cornering, it is possible to process data of the ground-contact-force sensor 18 in accordance with the track of the tire 12. Further, even if the tire enters the tire testing apparatus 10 while decelerating or accelerating, it is possible to process data of the ground-contact-force sensor 18 taking into account these situations. Thereby, an accurate and quick analysis processing can be performed.

Furthermore, in the present embodiment, it is possible to verify precision of the ground-contact-force sensor 18 by comparing the sum of load values obtained by the ground-contact-force sensor 18 with the sum of load values obtained by the plate sensor 16.

In addition, according to the present embodiment, since the ground-contact-force sensor 18 and the plate sensor 16 are fixed to the plate 14, it is possible to accurately set a positional relation between both the sensors. If an additional sensor is installed in a conventional manner, it requires time to perform operations, such as determination of the positional relation between sensors and synchronization of them. However, in the present embodiment, it is easy to perform such operations.

In the above-described embodiment, four plate sensors 16 are provided. However, the number of the plate sensors 16 is not limited to this, and it may be one to three, or five or more. In view of obtaining the centroid of the load of the plate 14, it is preferable that the number be three or more. Further, the shape of the plate 14 is not limited to a rectangle, and it is possible to use a plate in various shapes, such as a polygon or a circle.

The base 20 may be provided with a drain opening and a groove for routing the cable although not specifically mentioned in the above embodiment.

DESCRIPTION OF THE SYMBOLS

10 Tire testing apparatus
12 Tire
14 Plate
16 Plate sensor
18 Ground-contact-force sensor
20 Base
22 Road surface
24 Control device
26 Display

The invention claimed is:

1. A tire testing apparatus comprising:
   a plate buried in a road surface with which a tire is in contact;
   at least one ground-contact-force sensor measuring a ground-contact force during a direct contact of the tire, the ground-contact-force sensor being fixed on the plate in an embedded state and configured to directly contact the tire when the tire passes over the plate; and
   at least one plate sensor measuring a load applied at a plurality of positions to the plate simultaneously with the ground-contact-force sensor measuring the ground contact force, and providing output signals from both sensors that allow the determination of a centroid of the load on the plate
   wherein the plurality of positions of the at least one plate sensor are separately spaced from the ground-contact-force sensor.

2. The tire testing apparatus according to claim 1, wherein output signals of the ground-contact-force sensor are obtained based on output signals of the plate sensor.

3. The tire testing apparatus according to claim 1, wherein output signals of the ground-contact-force sensor are obtained based on output signals of the plate sensor.

4. The tire testing apparatus according to claim 1, wherein the at least one plate sensor actuates the ground-contact-force sensor when it detects a pressure above a predetermined threshold.

5. The tire testing apparatus according to claim 1, wherein the plate sensor further verifies the precision of the ground-contact force measured by the ground-contact-force sensor.

6. A tire testing apparatus comprising:
   a plate buried in a road surface with which a tire is in contact;
   at least one ground-contact-force sensor measuring a ground-contact force during a direct contact of the tire, the ground-contact-force sensor being fixed on the plate in an embedded state and configured to directly contact the tire when the tire passes over the plate; and
   at least one plate sensor measuring a load applied at a plurality of positions to the plate simultaneously with the ground-contact-force sensor measuring the ground contact force, and providing output signals that allow the determination of the load on the plate in order to verify the precision of the ground-contact force measured by the ground-contact-force sensor.

* * * * *